(12) United States Patent
Dalwadi

(10) Patent No.: US 10,846,582 B2
(45) Date of Patent: Nov. 24, 2020

(54) ACTIVE RECEIVER FOR CONNECTED RFID TAGS

(71) Applicant: NXP B.V., Eindhoven (NL)

(72) Inventor: Jaydeep Girishkumar Dalwadi, Irvine, CA (US)

(73) Assignee: NXP B.V., Eindhoven (NL)

( * ) Notice: Subject to any disclaimer, the term of this patent is extended or adjusted under 35 U.S.C. 154(b) by 122 days.

(21) Appl. No.: 16/214,056

(22) Filed: Dec. 8, 2018

(65) Prior Publication Data

US 2019/0180160 A1    Jun. 13, 2019

(30) Foreign Application Priority Data

Dec. 8, 2017 (EP) .................................. 17206230

(51) Int. Cl.

| G06K 19/07 | (2006.01) |
| G06K 7/00 | (2006.01) |
| H01Q 1/22 | (2006.01) |
| H01Q 1/44 | (2006.01) |
| H04B 5/00 | (2006.01) |

(52) U.S. Cl.
CPC ....... *G06K 19/0723* (2013.01); *G06K 7/0008* (2013.01); *G06K 19/0709* (2013.01); *G06K 19/0715* (2013.01); *H01Q 1/2225* (2013.01); *H01Q 1/44* (2013.01); *H04B 5/0031* (2013.01); *H04B 5/0062* (2013.01)

(58) Field of Classification Search
CPC .. H01Q 1/2225; H04B 5/0025; H04B 5/0031; H04B 5/0037; H04B 5/0056; H04B 5/0062; H04B 5/0068; G06K 7/0008; G06K 19/0709; G06K 19/0715; G06K 19/0723
See application file for complete search history.

(56) References Cited

U.S. PATENT DOCUMENTS

| 6,213,402 | B1 | 4/2001 | Reiner | |
| 8,237,561 | B2 | 8/2012 | Beigel et al. | |
| 8,243,863 | B2* | 8/2012 | Kobayashi | G06K 19/0723 |
| | | | | 375/349 |
| 8,326,224 | B2* | 12/2012 | Butler | G06K 19/0701 |
| | | | | 455/41.1 |
| 8,643,470 | B2* | 2/2014 | Toriyama | G06K 19/0724 |
| | | | | 235/487 |

(Continued)

OTHER PUBLICATIONS

Extended European Search Report for Patent Appln. No. 17206230.9 (dated May 25, 2018).

*Primary Examiner* — Thien M Le
*Assistant Examiner* — April A Taylor

(57) ABSTRACT

A RFID tag (1) for communicating with an external reader comprises: two antenna connections (LA, LB) for connecting the RFID tag (1) to an antenna (10), an active receiver switch circuit (5) for receiving two input sinusoidal signals from the two antenna connections (LA, LB) and generating a rectified waveform signal (8), a modulation detection circuit (12) for receiving two input sinusoidal signals from the two antenna connections (LA, LB) and generating a first demodulation signal (13) related to a 10% amplitude modulation of a RF field for communication between the reader and the RFID tag (1) and a second demodulation signal (14) related to a 100% amplitude modulation of a RF field for communication between the reader and the RFID tag (1).

20 Claims, 4 Drawing Sheets

(56) References Cited

U.S. PATENT DOCUMENTS

| | | |
|---|---|---|
| 9,513,609 B2 | 12/2016 | Thueringer et al. |
| 2005/0056704 A1 | 3/2005 | Kim |
| 2008/0266061 A1 | 10/2008 | Stiglic et al. |
| 2009/0011706 A1* | 1/2009 | Wilson .................... H04B 5/02 |
| | | 455/41.1 |

* cited by examiner

ACTIVE RECEIVER FOR CONNECTED RFID TAGS

CROSS-REFERENCE TO RELATED APPLICATIONS

This application claims the priority under 35 U.S.C. § 119 of European patent application no. 17206230.9, filed on Dec. 8, 2017, the contents of which are incorporated by reference herein.

FIELD OF THE INVENTION

The present invention relates to an active receiver for connected RF tags. Particularly, but not exclusively, the present invention relates to NFC (Near Filed Communication) Tags.

BACKGROUND OF THE INVENTION

RFID (Radio Frequency IDentification) tags, in particular NFC (Near Filed Communication) tags, are making a huge impact in the contactless market. Especially the tags which can communicate at a higher distance are becoming more enticing when it comes to Infrastructure applications.

Traditionally RFID tags have been implemented with passive transmission capabilities. Such tags work on the available RF (Radio Frequency) field and the internal supply of the RFID tag is generated from the RF field to supply the internal system (including analog and digital circuits) of the tag (power-by-field). This internal system usually consumes typically 10 to 200 µA. The RF field available can vary from about 0.15 A/m to 12 A/m according to the international standard ISO 15693 and 1.5 A/m to 18 A/m according to the international standard ISO 14443. To generate an internal supply from available RF field, such tags implement a full wave rectifier architecture, as shown in FIGS. 6 to 8.

As shown in FIG. 6, a typical RFID system 100 comprises an antenna 101 and a RFID tag chip 102 connected together at two antenna connections $L_A$ and $L_B$. The tag chip 102 includes of a main rectifier 103, including two diodes 103a, 103b respectively connected to the antennas connections $L_A$ and $L_B$, followed by a main LDO (Low-Dropout Regulator) 104, which generates a supply for the whole system, represented by the digital circuits 105 and the analog circuits 106. In order to derive power from the RF field, a switch block 107 is used between the antennas connections $L_A$ and $L_B$ in order to convert the waveforms at the two antennas connections $L_A$ and $L_B$ to a resulting rectified waveform signal 108 shown in FIG. 8. The switch block 107 operates in such a way that, of the two signals coming from the antenna connections $L_A$ and $L_B$, only the greater signal is passed to the main rectifier 103, which receives as input the full-wave rectified waveform signal 108.

The switch block 107 is shown more in detail in FIG. 7 and includes two switches 111 and 112 to convert the antenna signal into rectified waveform signal 108 shown in FIG. 8. When the signal from the antenna connection $L_A$ is greater than the signal from the antenna connection $L_B$, the switch 112, which is directly connected to the antenna connection $L_B$ is ON and shorts the antenna connection $L_B$ to ground (GND). The signal from the antenna connection $L_A$ passes through the diode 103a of the main rectifier 103. Vice versa, when the signal from the antennas connection $L_B$ is greater than the signal from the antennas connection $L_A$, the switch 111, which is directly connected to the antenna connection $L_A$ is ON and shorts the antenna connection $L_A$ to ground (GND). The signal from the antenna connection $L_B$ passes through the diode 103b of the main rectifier 103.

With reference to FIG. 6, the tag chip 102 further includes a sense rectifier 110 including two diodes 110a, 110b respectively connected to the antennas connections $L_A$ and $L_B$, followed by a limiter 115, which senses the rectified output voltages from the two diodes 110a, 110b and maintains voltage from the antennas connections $L_A$ and $L_B$ within maximum absolute voltage rating of the RF frontend, i.e. of all the circuits connected to the antennas connections $L_A$ and $L_B$.

It may be desirable to define a new RFID tag architecture working with the same type of antenna signal as is seen in the passive power-by-field case described above, but which integrates both passive as well as active transmission capability in a single tag.

OBJECT AND SUMMARY OF THE INVENTION

According to the present invention such new RFID tag architecture is achieved by providing an RFID tag according to the independent claims are provided. The dependent claims describe advantageous developments and modifications of the invention. According to the present invention a RFID tag for communicating with an external reader is provided, which comprises:

two antenna connections for connecting the RFID tag to an antenna, an active receiver switch circuit for receiving two input sinusoidal signals from the two antenna connections and generating a rectified waveform signal, a modulation detection circuit for receiving two input sinusoidal signals from the two antenna connections and generating a first demodulation signal related to a 10% amplitude modulation of a RF field for communication between the reader and the RFID tag and a second demodulation signal related to a 100% amplitude modulation of a RF field for communication between the reader and the RFID tag.

According to embodiments of the present invention the active receiver switch circuit further includes:

a high speed comparator having as input the two input sinusoidal signals from the two antenna connections, and/or two switches for respectfully connecting to a ground the two input sinusoidal signals from the two antenna connections, the switches being arranged in such a way that the lower of the two input sinusoidal signals is connected to the ground, and/or a third switch, a fourth switch and a non-overlapping circuit, the non-overlapping circuit receiving the output high speed comparator and generating two recovered clock signals, respectively connected to third switch and the fourth switch.

a voltage limiter circuit.

Particularly, the voltage limiter circuit may limit the signals from the two antenna connections to a maximum voltage of 2V.

Advantageously, the active receiver switch circuit performs two functions:

compares the two antennas input signals and decides which is greater than the other;

shorts the either input signal, whichever is lower in voltage that the other.

According to embodiments of the present invention the modulation detection circuit further includes a filtering circuit receiving the rectified waveform signal as input and producing as output:
- a filtered signal proportional to the amplitude of the rectified waveform signal,
- a first threshold voltage signal related to a 10% amplitude modulation of the RF field for communication between the reader and the RFID tag and
- a second threshold voltage signal related to 100% amplitude modulation of a RF field for communication between the reader and the RFID tag.

According to embodiments of the present invention, the modulation detection circuit further includes:
- a first modulation comparator for comparing the filtered signal and the first threshold voltage signal and generating the first demodulation signal,
- a second modulation comparator for comparing the filtered signal and the second threshold voltage signal and generating the second demodulation signal.

According to embodiments of the present invention, the RC filtering circuit comprises a plurality of filter switches connected to the outputs corresponding to the first threshold voltage signal and the second threshold voltage signal, the filter switches being operated in feedback by the first threshold voltage signal.

Advantageously, the modulation detection circuit above described permits to sense the modulation from reader to tag.

Advantageously, the present invention allows to efficiently providing a tag which can respond with active and passive back-modulations. The efficiency derives from the simple structure which avoids for example automatic gain control or the use of DLL to generate a clock to sample a sinusoidal signal right in middle such that only peak value is sampled, thus also providing a reduction in costs. The tag architecture provided by the present invention adapts to the same waveform of the signals from the antenna connection as the power-by-field tags, which use passive back modulation. Hence, this architecture when used make possible integration of active receiver with passive receiver.

Advantageously, the present invention may find implementation in:
- any smart RFID tag application which requires both passive as well as active back-modulation, also where active receiver needs to be integrated with passive frontend in tag which can also work in power-by-field mode,
- applications where tag may be required to communicate with very small size of antenna while battery is present,
- mobile tag communication systems.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

Figure 1:
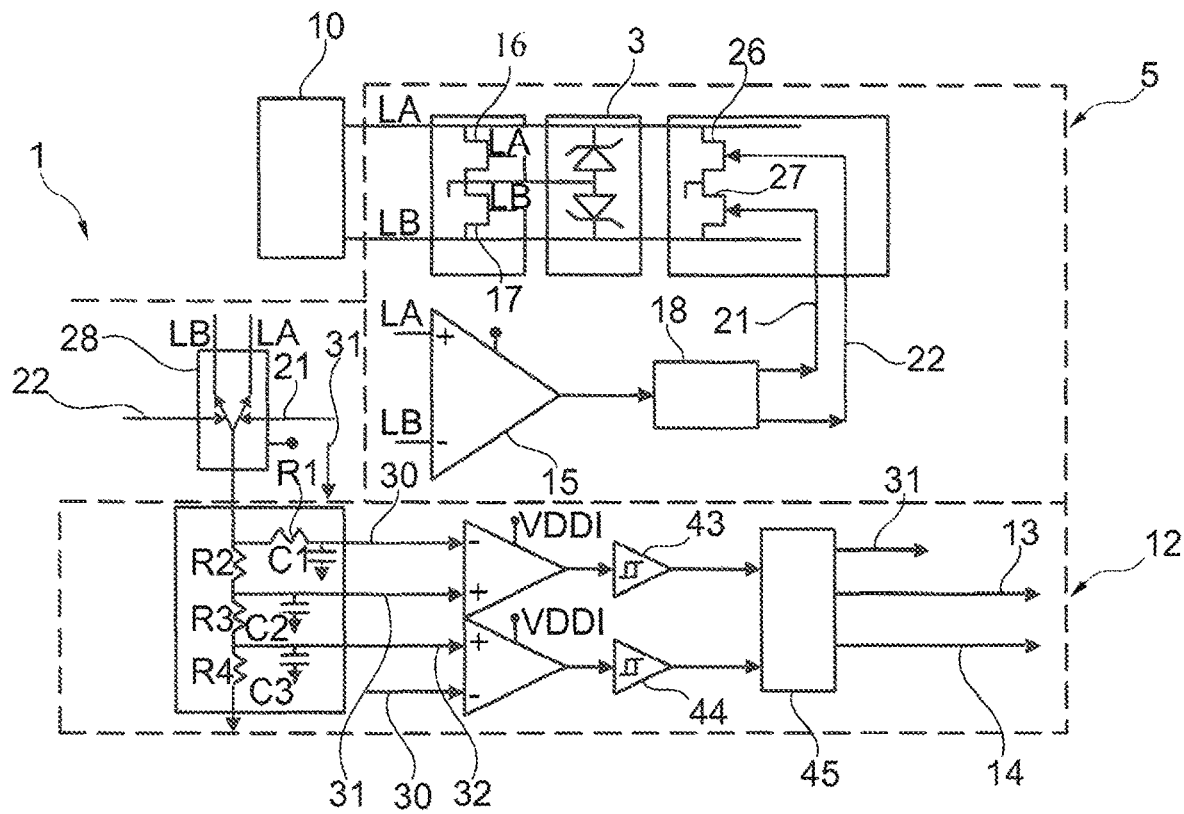
FIG. 1 shows a schematic view of a RFID tag according to the present invention.

FIG. 1 shows a RFID tag 1 for communicating with an external reader (not shown) through an antenna 10. The RFID tag 1 comprises two antenna connections $L_A$, $L_B$ for connecting the RFID tag 1 to an antenna 10 and two main circuits 5, 12
- an active receiver switch circuit 5 and
- a modulation detection circuit 12.

Figure 2:
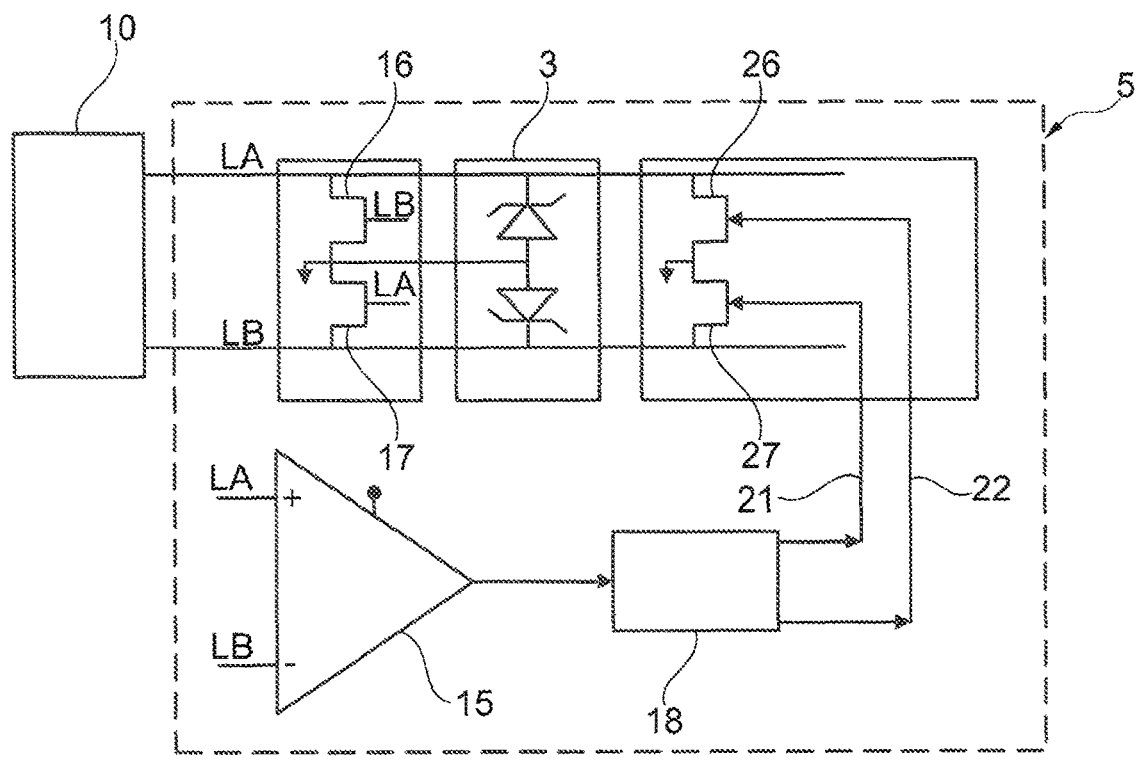
FIG. 2 shows a schematic view of a first detail portion of the RFID tag of FIG. 1.
Figure 4:
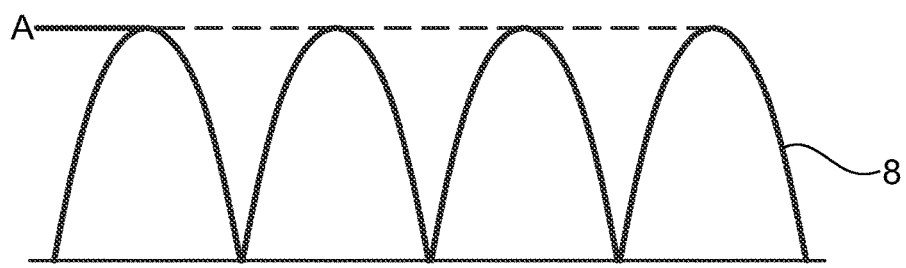
FIG. 4 shows a diagram representing a plurality of signals which are generated in the RFID tag of FIG. 1.
Figure 4:
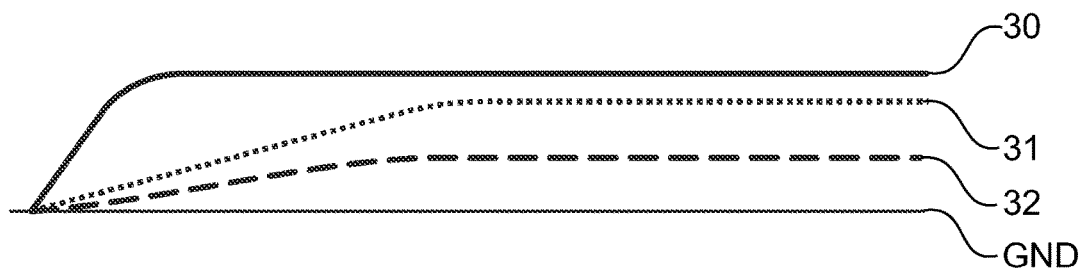
Figure 8:
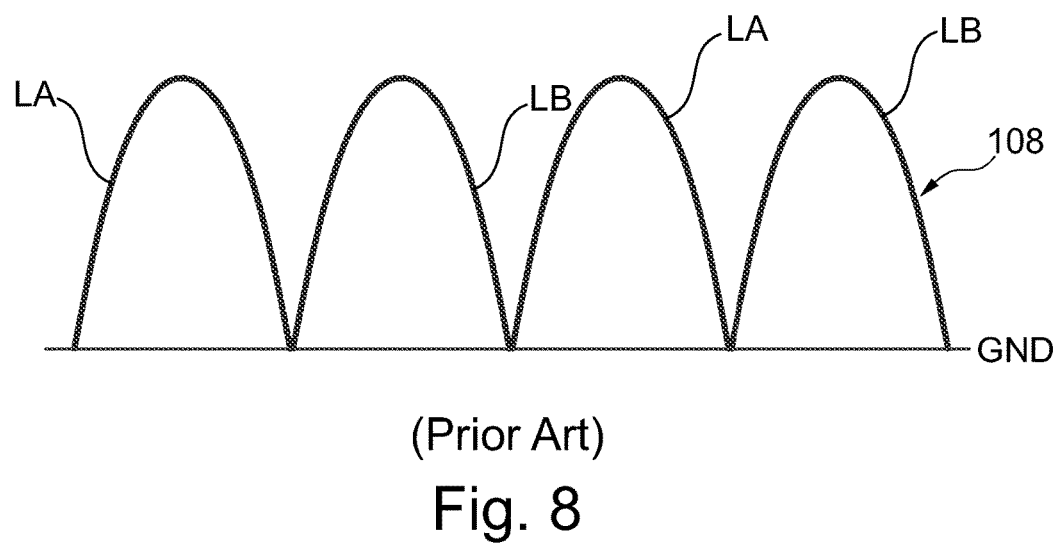
FIG. 8 shows a diagram representing a signal which is generated in the RFID tag of FIG. 7.

With reference to FIG. 2, the active receiver switch circuit 5 receives two input sinusoidal signals from the two antenna connections $L_A$, $L_B$ and generates as output a rectified waveform signal 8 (shown in FIG. 4 and analogous to the signal 108 of FIG. 8, mentioned with reference to the prior art).

The active receiver switch circuit 5 includes a first switch 16 and a second switch 17 for respectfully connecting to a ground GND the two input sinusoidal signals from the two antenna connections $L_A$, $L_B$. The switches are arranged in such a way that the lower of the two input sinusoidal signals is connected to the ground GND. When the signal from the antenna connection $L_A$ is greater than the signal from the antenna connection $L_B$, the second switch 17, which is directly connected to the antenna connection $L_B$ is ON and shorts the antenna connection $L_B$ to ground (GND). Vice versa, when the signal from the antennas connection $L_B$ is greater than the signal from the antennas connection $L_A$, the first switch 16, which is directly connected to the antenna connection $L_A$ is ON and shorts the antenna connection $L_A$ to ground (GND). The result is the rectified waveform signal 8.

The active receiver switch block 5 further includes a high speed comparator 15 having as input the two input sinusoidal signals from the two antenna connections $L_A$, $L_B$. The high speed comparator 15 has the following characteristics:
- as low offset voltage, as possible
- as fast high speed as possible.

Preferably the high speed comparator 15 has very low delay variation; enough that delay related offset become very predictable.

The offset and delay of comparator will introduce error in sampling of the signals from the antenna 10, which would cause the signal level to be lower in magnitude than in-reality. This means that the modulation detection circuit 12 has preferably to work with lower voltages.

To achieve this, the active receiver switch block 5 further includes a voltage limiter circuit 3, for example limiting the signals from the two antenna connections $L_A$, $L_B$ to a maximum voltage of 2V. The output of the high speed comparator 15 is used by a non-overlapping circuit 18 for generating two recovered clock signals 21, 22, respectively connected to a third switch 26 and a fourth switch 27. The third switch 26 and a fourth switch 27 operate analogously to the first and second switches 16, 17. The non-overlapping circuit 18 assures that any of the third switch 26 and the fourth switch 27 is ON at any time.

Figure 3:
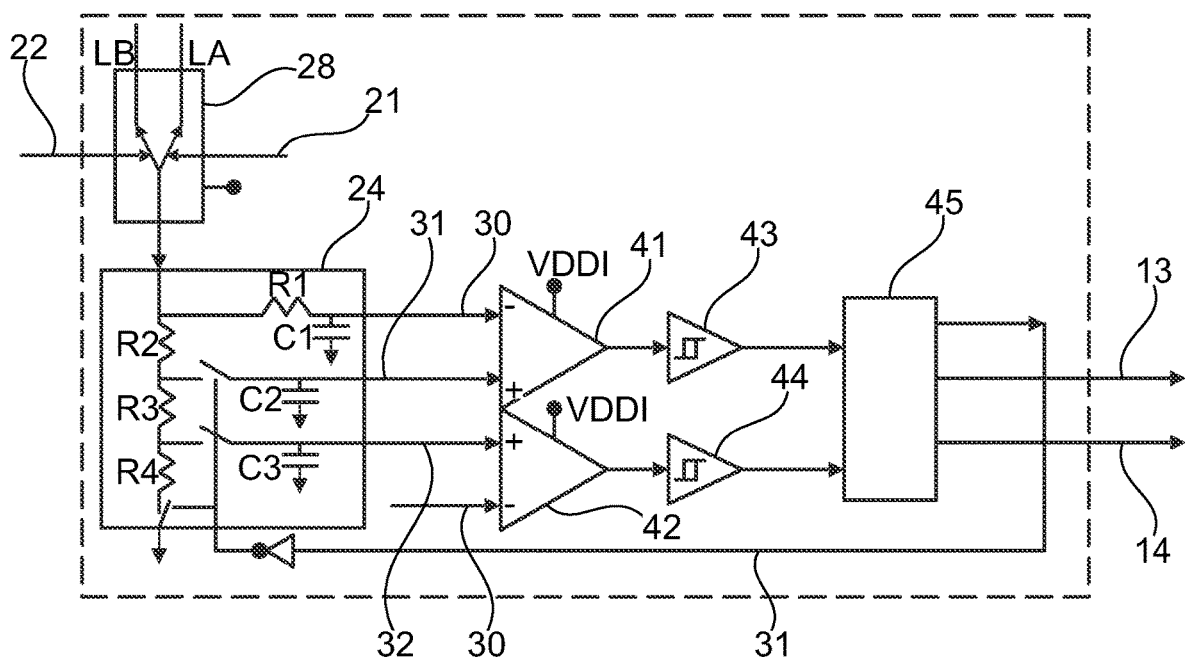
FIG. 3 shows a schematic view of a second detail portion of the RFID tag of FIG. 1.

With reference to FIG. 3, the modulation detection circuit 12 receives the two input sinusoidal signals from the two antenna connections $L_A$, $L_B$ and generates a first demodulation signal 13 related to a 10% amplitude modulation of a RF field for communication between the reader and the RFID tag 1 and a second demodulation signal 14 related to a 100% amplitude modulation of the RF field.

The modulation detection circuit 12 includes an active full wave rectifier 28 receiving as input the two input sinusoidal signals from the two antenna connections $L_A$, $L_B$ and two recovered clock signals 21, 22 to generate as an output a signal analogous to the rectified waveform signal 8, which is used as input from a filtering circuit 24 of the modulation detection circuit 12. The filtering circuit 24 produces as output:
- a filtered signal 30 proportional to the amplitude A of the rectified waveform signal 8. In particular, the amplitude of the filtered signal 30 may be equal to A/1.57;
- a first threshold voltage signal 31 related to a 10% amplitude modulation of the RF field and
- a second threshold voltage signal 32 related to 100% amplitude modulation of the RF field.

The modulation detection circuit 12 further includes:
- a first modulation comparator 41 for comparing the filtered signal 30 and the first threshold voltage signal 31,
- a second modulation comparator 42 for comparing the filtered signal 30 and the second threshold voltage signal 31

The output signals of the modulation comparators 41, 42 pass through respective Schmidt triggers 43, 43 and are both given as input to a modulation masking block 45 which generates as output the first demodulation signal 13 and the second demodulation signal 14. The masking block 45 is a simple combinational logic; for example it may be an AND gate receiving as input signals the output from the modulation comparators 41, 42 and another signal from a system (not shown) which acts as enabler/disabler. The modulation masking block 45 also transmits the first threshold voltage signal 31 related to a 10% amplitude modulation of the RF field as feedback signal to the filtering circuit 24 as detailed in the following.

Figure 5:
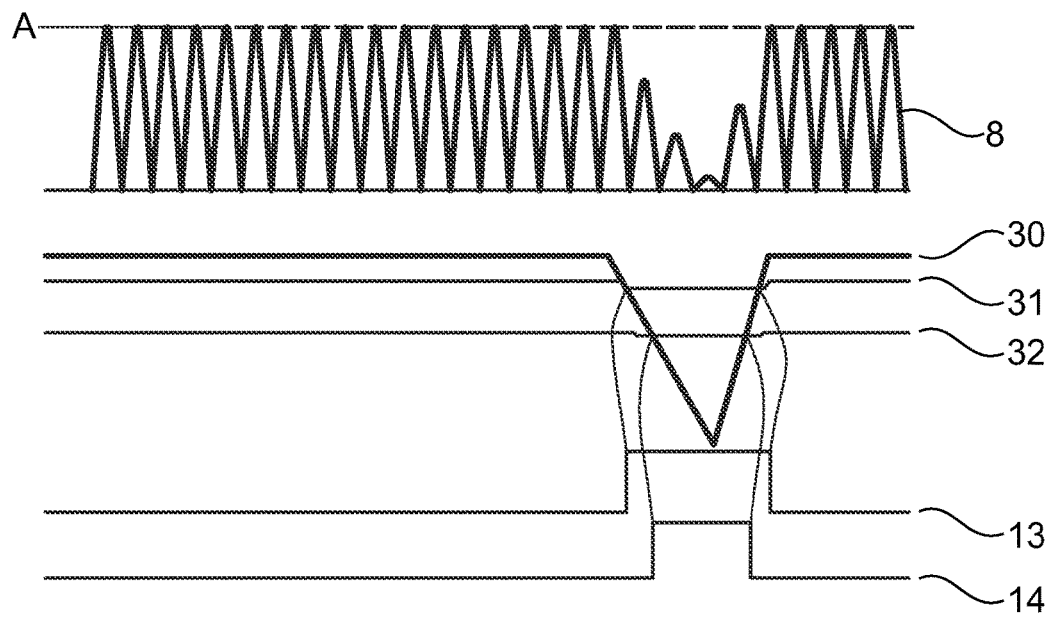
FIG. 5 shows a diagram representing a plurality of signals during modulation pulses in the communication between a reader and the RFID tag of FIG. 1.
Figure 6:
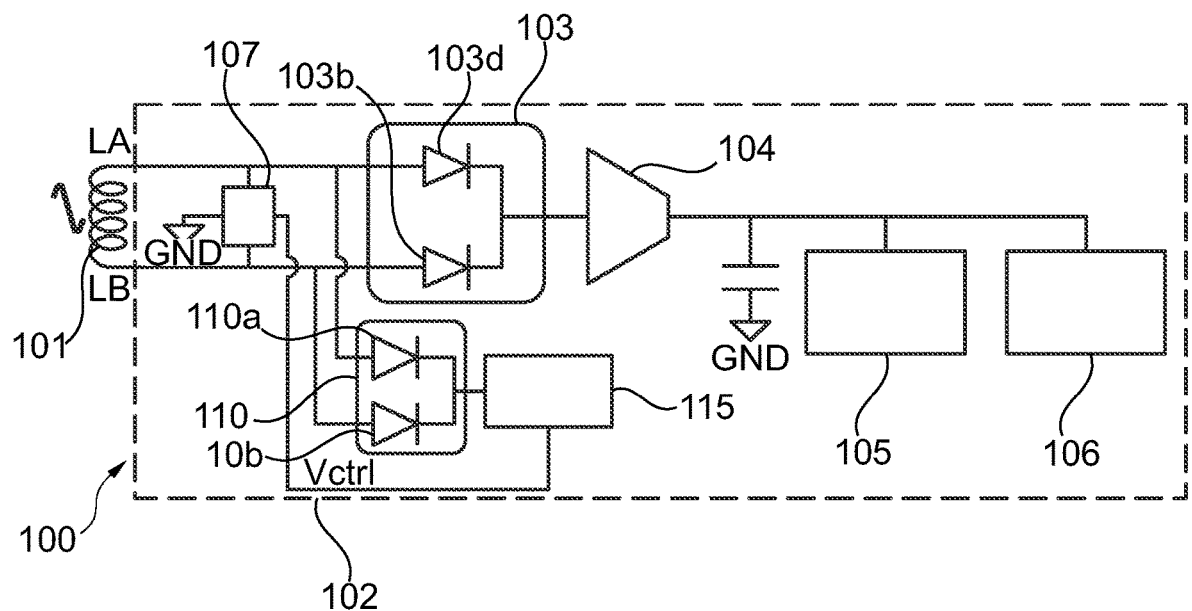
FIG. 6 shows a schematic view of a RFID tag according to the prior art.
Figure 7:
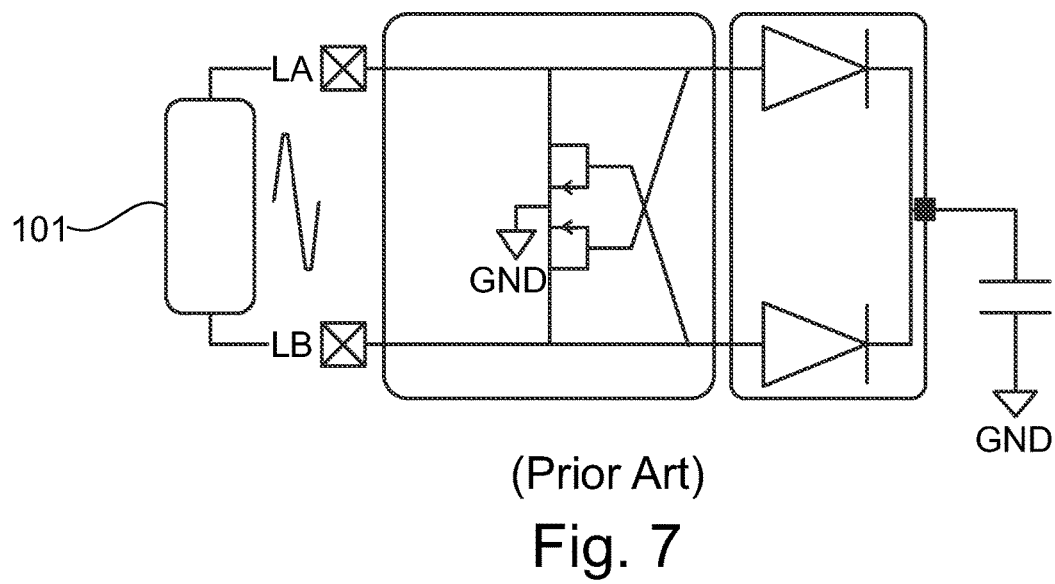
FIG. 7 shows a schematic view of a first detail portion of the RFID tag of FIG. 65.

The filtering circuit 24 is of the RC type and includes a first filter R1C1 which receives the full wave rectified signal generated by the active full wave rectifier 28 and gives as output the filtered signal 30. The filtering circuit 24 further includes a second filter R2C2 in series with the first filter R1C1. The second filter R2C2 receives the full wave rectified signal generated by the active full wave rectifier 28 and gives as output the first threshold voltage signal 31. The filtering circuit 24 further includes a third filter R3C3 in series with the second filter R2C2. The third filter R3C3 generates as output second threshold voltage signal 32. A ground resistance R4 is interposed between the third filter R3C3 and the ground GRD. The RC filtering circuit 24 further comprises a plurality of filter switches. A first filter switch 51 is interposed between the resistance R2 and the capacitance C2 of the second filter R2C2. A second filter switch 52 is interposed between the resistance R3 and the capacitance C3 of the third filter R3C3. A third filter 53 is interposed between the ground resistance R4 and the ground GRD. The filter switches 51, 52, 53 are operated in feedback by the first threshold voltage signal 31 transmitted back by the modulation masking block 45. When 10% amplitude modulation is asserted the filter switches 51, 52, 53 turn OFF. This will make sure the threshold voltage stored on C2 and C3 do not discharge during further fall signals from the two antenna connections $L_A$, $L_B$, i.e. during "Reader to Tag" modulation pulses, shown for example in FIG. 5.

The second filter R2C2 and the third filter R3C3 have time constant of about 60 μS and have very low cut-off which is very low compared to data frequency. The cut-off of the second filter R2C2 and the third filter R3C3 is decided by speed at which the RF field can vary. Since the communication between the RFID tag 1 and the reader depends from to human behavior the change in the RF field while the end-user is performing the communication would take couple of tens of milliseconds at least.

REFERENCE NUMERALS

1 RFID tag
3 voltage limiter
5 active receiver switch circuit
8 rectified waveform signal 8
10 antenna
12 modulation detection circuit
13, 14 demodulation signals
15 high speed comparator
16, 17 switches
18 non-overlapping circuit
21, 22 recovered clock signals
24 filtering circuit
26, 27 switches
28 active full wave rectifier
30 filtered signal
31 first threshold voltage signal
32 second threshold voltage signal
41, 42 modulation comparators
43, 44 Schmidt triggers
45 modulation masking block
51, 52, 53 filter switches

The invention claimed is:
1. A Radio Frequency IDentification (RFID) tag for communicating with an external reader comprising:
two antenna connections for coupling the RFID tag to an antenna,
an active receiver switch circuit for receiving two input sinusoidal signals from the two antenna connections and generating a rectified waveform signal,
a modulation detection circuit for receiving the two input sinusoidal signals from the two antenna connections and generating a first demodulation signal related to a 10% amplitude modulation of a Radio Frequency (RF) field for communication between the external reader and the RFID tag and a second demodulation signal related to a 100% amplitude modulation of the RF field for communication between the external reader and the RFID tag,
wherein the modulation detection circuit includes a filtering circuit receiving the rectified waveform signal as input and producing as output: a filtered signal proportional to an amplitude of the rectified waveform signal, a first threshold voltage signal related to a 10% amplitude modulation of the RF field for communication between the external reader and the RFID tag, and a second threshold voltage signal related to 100% amplitude modulation of the RF field for communication between the external reader and the RFID tag.
2. The RFID tag according to claim 1, wherein the active receiver switch circuit further includes a high speed comparator having as input the two input sinusoidal signals from the two antenna connections.

3. The RFID tag according to claim 1, wherein the active receiver switch circuit further includes two switches for respectfully coupling to a ground the two input sinusoidal signals from the two antenna connections, the switches being arranged in such a way that a lower of the two input sinusoidal signals is coupled to the ground.

4. The RFID tag according to claim 1, wherein the active receiver switch circuit includes a voltage limiter circuit.

5. The RFID tag according to claim 4, wherein the voltage limiter circuit limits signals received from the two antenna connections to a maximum voltage of 2V.

6. The RFID tag according to claim 1, wherein the filtering circuit is of an RC type.

7. The RFID tag according to claim 6, wherein the filtering circuit comprises a plurality of filter switches coupled to outputs corresponding to the first threshold voltage signal and the second threshold voltage signal, the filter switches being operated in feedback by the first threshold voltage signal.

8. The RFID tag according to claim 1, wherein the modulation detection circuit further includes:
 a first modulation comparator for comparing the filtered signal and the first threshold voltage signal and generating the first demodulation signal,
 a second modulation comparator for comparing the filtered signal and the second threshold voltage signal and generating the second demodulation signal.

9. A Radio Frequency IDentifiication (RFID) tag for communicating with an external reader comprising:
 two antenna connections for coupling the RFID tag to an antenna,
 an active receiver switch circuit for receiving two input sinusoidal signals from the two antenna connections and generating a rectified waveform signal,
 a modulation detection circuit for receiving the two input sinusoidal signals from the two antenna connections and generating a first demodulation signal related to a 10% amplitude modulation of a Radio Frequency (RF) field for communication between the external reader and the RFID tag and a second demodulation signal related to a 100% amplitude modulation of an RF field for communication between the external reader and the RFID tag,
 wherein the active receiver switch circuit further includes a high speed comparator having as input the two input sinusoidal signals from the two antenna connections,
 wherein the active receiver switch circuit further includes a first switch, a second switch and a non-overlapping circuit, the non-overlapping circuit receiving an output of the high speed comparator and generating two recovered clock signals, respectively coupled to the first switch and the second switch.

10. The RFID tag according to claim 9, wherein the modulation detection circuit includes a filtering circuit receiving the rectified waveform signal as input and producing as output:
 a filtered signal proportional to an amplitude of the rectified waveform signal,
 a first threshold voltage signal related to the 10% amplitude modulation of the RF field for communication between the external reader and the RFID tag and
 a second threshold voltage signal related to the 100% amplitude modulation of a RF field for communication between the external reader and the RFID tag.

11. The RFID tag according to claim 10, wherein the filtering circuit is of an RC type.

12. The RFID tag according to claim 11, wherein the filtering circuit comprises a plurality of filter switches coupled to outputs corresponding to the first threshold voltage signal and the second threshold voltage signal, the filter switches being operated in feedback by the first threshold voltage signal.

13. The RFID tag according to claim 10, wherein the modulation detection circuit further includes:
 a first modulation comparator for comparing the filtered signal and the first threshold voltage signal and generating the first demodulation signal,
 a second modulation comparator for comparing the filtered signal and the second threshold voltage signal and generating the second demodulation signal.

14. The RFID tag according to claim 9, wherein the active receiver switch circuit includes a voltage limiter circuit.

15. The RFID tag according to claim 14, wherein the voltage limiter circuit limits signals received from the two antenna connections to a maximum voltage of 2V.

16. A method comprising:
 receiving two input sinusoidal signals from two antenna connections and generating a rectified waveform signal; and
 generating a first demodulation signal and a second demodulation signal, the first demodulation signal being related to a 10% amplitude modulation of a Radio Frequency (RF) field for communication between a Radio Frequency IDentification (RFID) reader and an RFID tag and the second demodulation signal being related to a 100% amplitude modulation of a RF field for communication between the reader and the RFID tag,
 wherein generating the first demodulation signal and the second demodulation signal comprises:
  filtering the rectified waveform signal and generating a filtered signal proportional to an amplitude of the rectified waveform signal, a first threshold voltage signal related to the 10% amplitude modulation of the RF field for communication between the reader and the RFID tag, and a second threshold voltage signal related to the 100% amplitude modulation of a RF field for communication between the reader and the RFID tag.

17. The method, as recited in claim 16, wherein generating the first demodulation signal and the second demodulation signal further comprises:
 comparing the filtered signal and the first threshold voltage signal and generating the first demodulation signal; and
 comparing the filtered signal and the second threshold voltage signal and generating the second demodulation signal.

18. The method, as recited in claim 16, wherein generating the rectified waveform signal comprises coupling to a ground a lower of the two input sinusoidal signals.

19. The method, as recited in claim 16, wherein generating the rectified waveform signal comprises limiting signals from two antenna connections to a maximum voltage of 2V.

20. The method, as recited in claim 16, wherein generating the rectified waveform signal comprises generating two recovered clock signals based on a high-speed comparison of the two input sinusoidal signals to a first threshold value and a second threshold value.

* * * * *